(12) United States Patent
Zang et al.

(10) Patent No.: US 8,639,757 B1
(45) Date of Patent: Jan. 28, 2014

(54) USER LOCALIZATION USING FRIEND LOCATION INFORMATION

(75) Inventors: Hui Zang, Cupertino, CA (US); Phyllis Joan Reuther, Brisbane, CA (US); Soshant Bali, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 307 days.

(21) Appl. No.: 13/209,011

(22) Filed: Aug. 12, 2011

(51) Int. Cl.
*G06F 15/16* (2006.01)

(52) U.S. Cl.
USPC ............ 709/204; 709/205; 709/217; 709/218

(58) Field of Classification Search
USPC ................................. 709/204, 205, 217, 218
See application file for complete search history.

(56) References Cited

U.S. PATENT DOCUMENTS

| | | | |
|---|---|---|---|
| 8,359,311 B2 * | 1/2013 | Wang et al. | 707/728 |
| 8,417,262 B2 * | 4/2013 | Loeb et al. | 455/456.2 |
| 2010/0233999 A1 * | 9/2010 | Loeb et al. | 455/414.1 |
| 2012/0302256 A1 * | 11/2012 | Pai et al. | 455/456.2 |

* cited by examiner

*Primary Examiner* — Liangche A Wang

(57) ABSTRACT

A method, system, and medium are provided for estimating a location of a user using location information of the user's friends. The user's friends are identified, and a social-interaction strength between the user and each of the friends is determined. This results in a set of weights of social ties that respectively indicate a level of social interaction between the user and the user's friends. The location of the friends is determined. The user's location is estimated based on the set of weights of social ties and the friend locations.

16 Claims, 8 Drawing Sheets

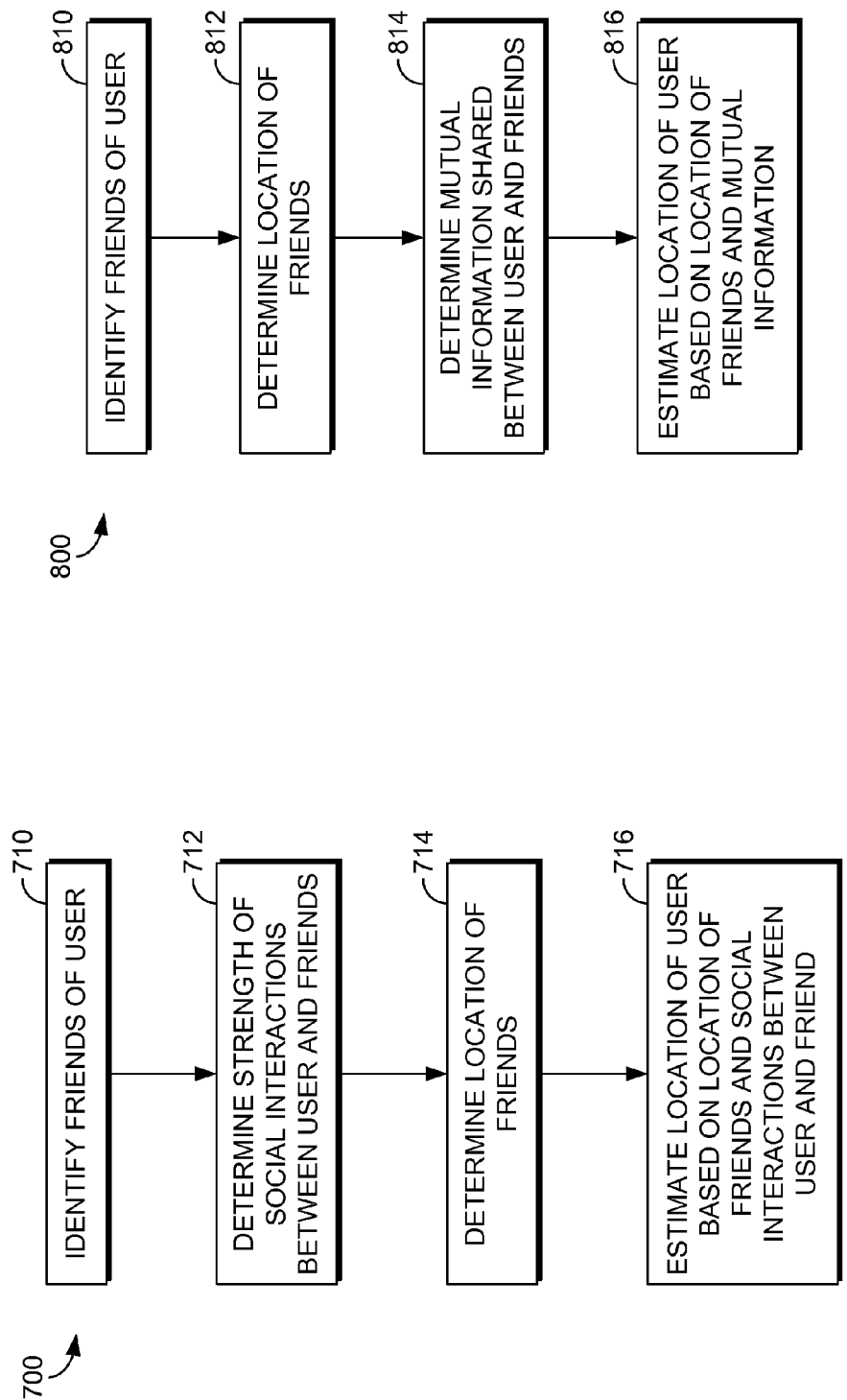

USER LOCALIZATION USING FRIEND LOCATION INFORMATION

SUMMARY

A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, ways to determine a location of a user of a mobile device by using location information associated with friends of the user. In one embodiment of the invention, the user's location is unknown, but the location of the user's friends is known. This information is used to estimate a location where the user is likely located. In another embodiment of the invention, the user's location is not accurately known, but accurate information is available concerning a friend's location. If there is a probability that the user is located near the friend, the friend's accurate location information is utilized to refine the user's location.

BRIEF DESCRIPTION OF THE SEVERAL VIEWS OF THE DRAWINGS

Illustrative embodiments of the present invention are described in detail below with reference to the attached drawing figures, and wherein:

FIG. 7 is a flow diagram showing a method of estimating a location of a user using the locations of the user's friends and social interactions between the user and the friends in accordance with an embodiment of the technology;

FIG. 8 is a flow diagram showing a method of estimating a location of a user using the locations of the user's friends and mutual information shared between the user and the user's friends in accordance with an embodiment of the technology.

DETAILED DESCRIPTION

Figure 1:
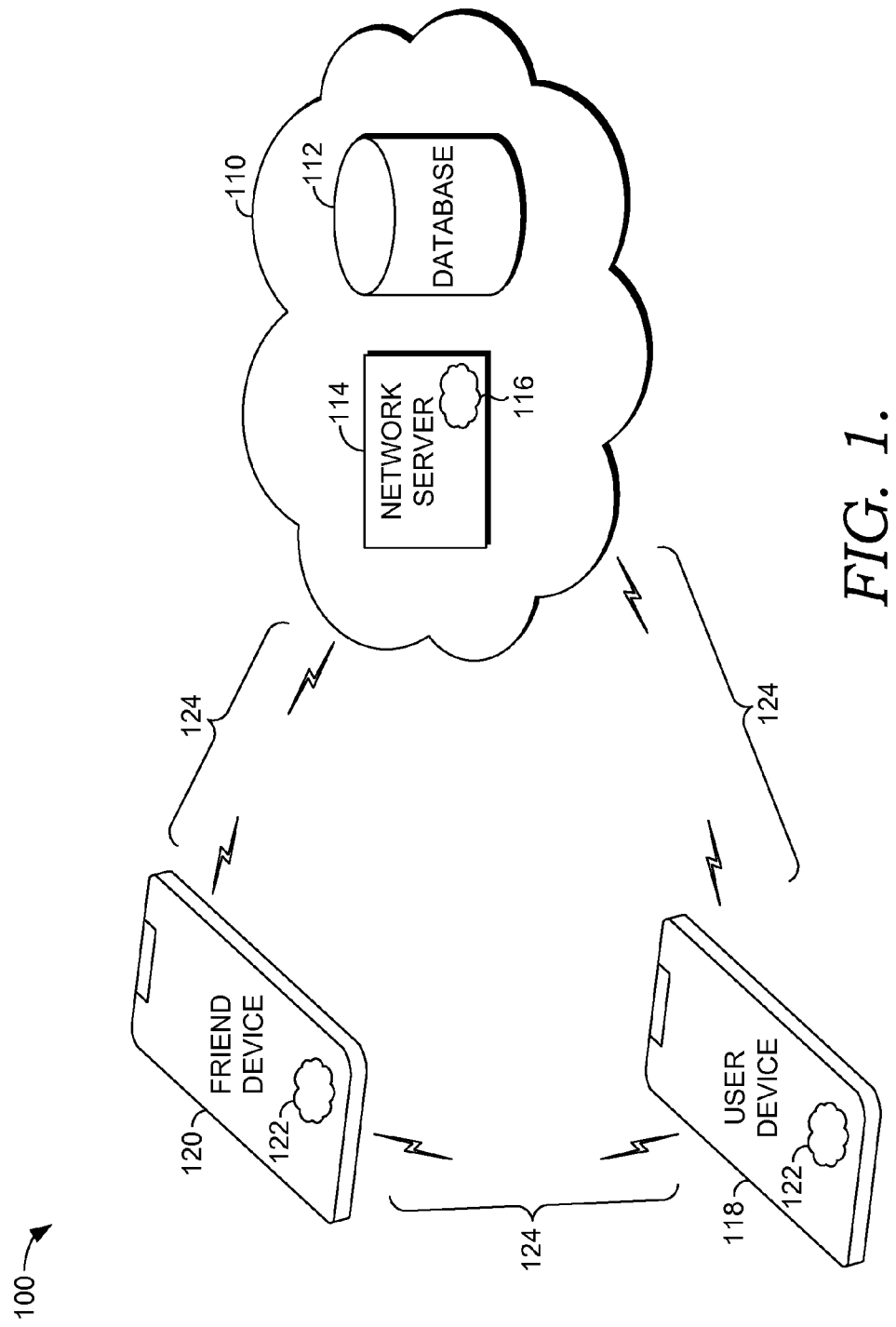
FIG. 1 depicts an illustrative wireless-telecommunications-network environment in accordance with an embodiment of the technology.

The subject matter of select embodiments of the present invention is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Further, various technical terms are used throughout this description. An illustrative resource that fleshes out various aspects of these terms can be found in Newton's Telecom Dictionary, 25th Edition (2009).

Embodiments of our technology may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media include media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Examples of the present invention are directed toward methods, systems, and computer-readable medium for use in localizing a user of a mobile device using location information associated with friends of the user. In one aspect, the user's friends are identified, and a social-interaction strength between the user and each of the friends is determined. A location is also determined for each of the user's friends, and the location information along with the social-interaction strength information is used to estimate a location of the user. In another aspect, the user's friends are identified along with their locations. Mutual information that is shared between the user and the friends is determined, and a location for the user is estimated based on the friend location information and the mutual information.

In a third aspect, a location is estimated for a user, and a friend of the user is identified. A location for the friend is determined; this location is known with a higher level of accuracy than that of the user's location. A probability that the user is near the friend is then determined, and, if the probability exceeds a predetermined threshold, the friend's location is used to refine the user's location.

Turning now to FIG. 1, an illustrative wireless-telecommunications-network environment is depicted according to one embodiment and is referenced generally by the numeral 100. This embodiment comprises a wireless-telecommunications-network 110 that includes a database 112, a network server 114 and a set of embodied computer-executable instructions 116 that carry out various functional aspects of the invention.

The database 112 may be configured to store information or data about a wireless-telecommunications-network user including information such as, for example, call data records associated with the user, historical location information associated with the user, user activity on the Internet, user activity associated with applications on the mobile device, text message records, electronic mail (email) records, information concerning the user's online social networks, information inputted by the user into the mobile device, and the like. Database 112 may also be configured to store similar information or data about other wireless-telecommunications-network subscribers. One or more of these other subscribers may be friends with the user as determined by a number of different methods that will be discussed in more depth below.

The network server 114 might operate in the wireless-telecommunications-network 110 using logical connections to one or more remote computers, mobile devices, and the database 112. The network server 114 typically includes, or has access to the computer-executable instructions 116. The network server may communicate with a user device 118 and a friend device 120 by way of a wireless-telecommunications link 124. The user device 118 and the friend device 120 may also communicate with each other using, for example, wide area networks (WANs), local area networks (LANs) and near-field communication technology. The user device 118 and the friend device 120 may also include a set of embodied computer-executable instructions 122 that carry out various functional aspects of the invention. Although only one friend device is shown in FIG. 1, it is contemplated that there can be numerous friend devices in communication with each other and with the wireless-telecommunications-network 110.

Figure 2:
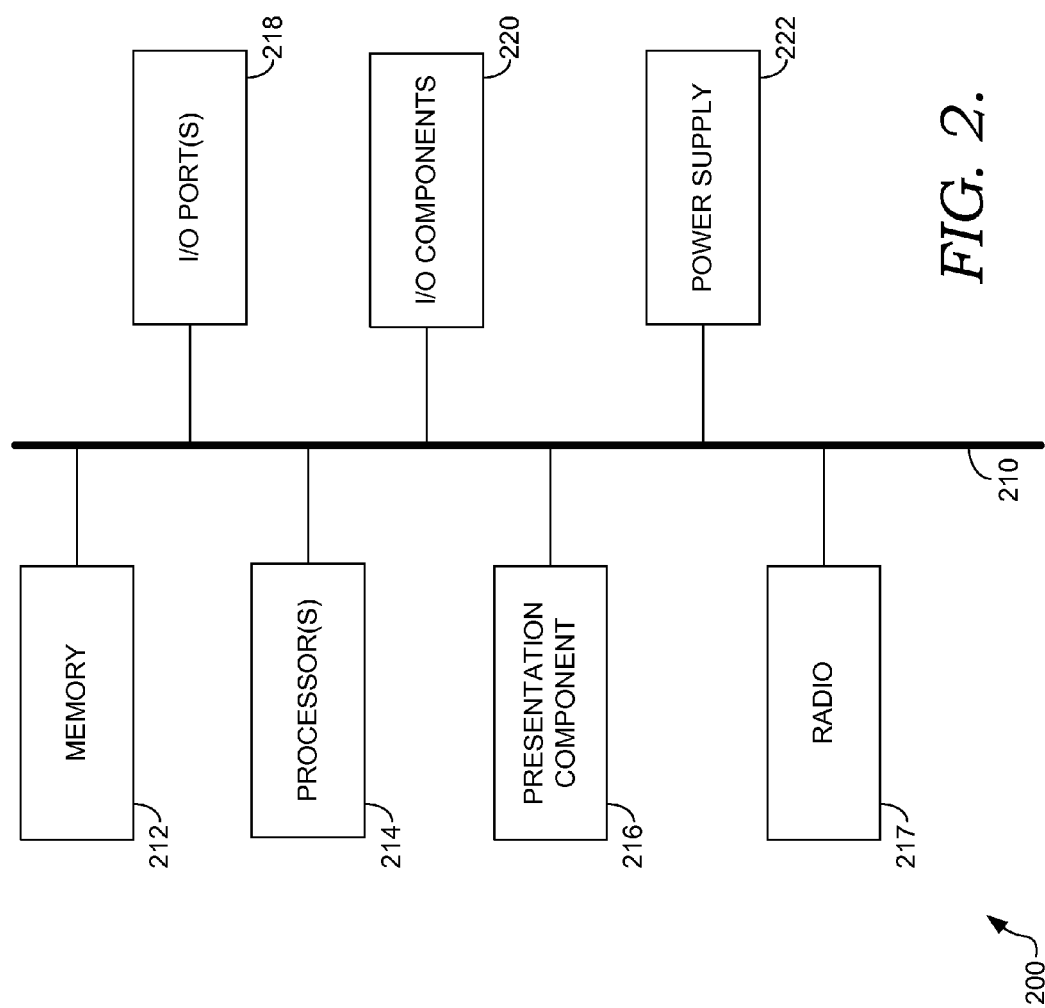
FIG. 2 depicts an illustrative mobile device suitable for practicing an embodiment of the present invention.

Turning now to FIG. 2, a block diagram of an illustrative mobile device according to one embodiment is provided and referenced generally by the numeral 200. The mobile device 200 may be the user device 118 or the friend device 120 of FIG. 1. Although some components are shown in the singular, they may be plural. For example, the mobile device 200 might include multiple processors or multiple radios, etc. As illustratively shown, the mobile device 200 includes a bus 210 that directly or indirectly couples various components together including memory 212, a processor 214, a presentation component 216, a radio 217, input/output ports 218, input/output components 220, and a power supply 222.

The memory 212 might take the form of memory components previously described. Thus, further elaboration will not be provided here, only to say that the memory component 212 can include any type of medium that is capable of storing information (e.g., a database). A database can be any collection of records. In one embodiment, the memory 262 includes a set of embodied computer-executable instructions that, when executed, facilitates various aspects disclosed herein. These embodied instructions will variously be referred to as "instructions" or an "application" for short.

The processor 214 might actually be multiple processors that receive instructions and process them accordingly. The presentation component 216 includes the likes of a display, a speaker, as well as other components that can present information (such as a lamp (LED), or even lighted keyboards).

The radio 217 facilitates communication with a wireless-telecommunications-network. Illustrative wireless-telecommunications technologies include CDMA, GPRS, TDMA, GSM, and the like (including what is known in the art as Wimax® technology and also Long Term Evolution (LTE)). In some embodiments, the radio 217 might also facilitate other types of wireless communications including Wi-Fi®, Bluetooth® communications, GIS communications, and other near-field communications.

The input/output port 218 might take on a variety of forms. Illustrative input/output ports include a USB jack, stereo jack, infrared port, proprietary communications ports, and the like. The input/output components 220 include items such as keyboards, microphones, speakers, touch screens, and any other item usable to directly or indirectly input data into the mobile device 200. The power supply 222 includes items such as batteries, fuel cells, or any other component that can act as a power source to power the mobile device 200.

Figure 3:
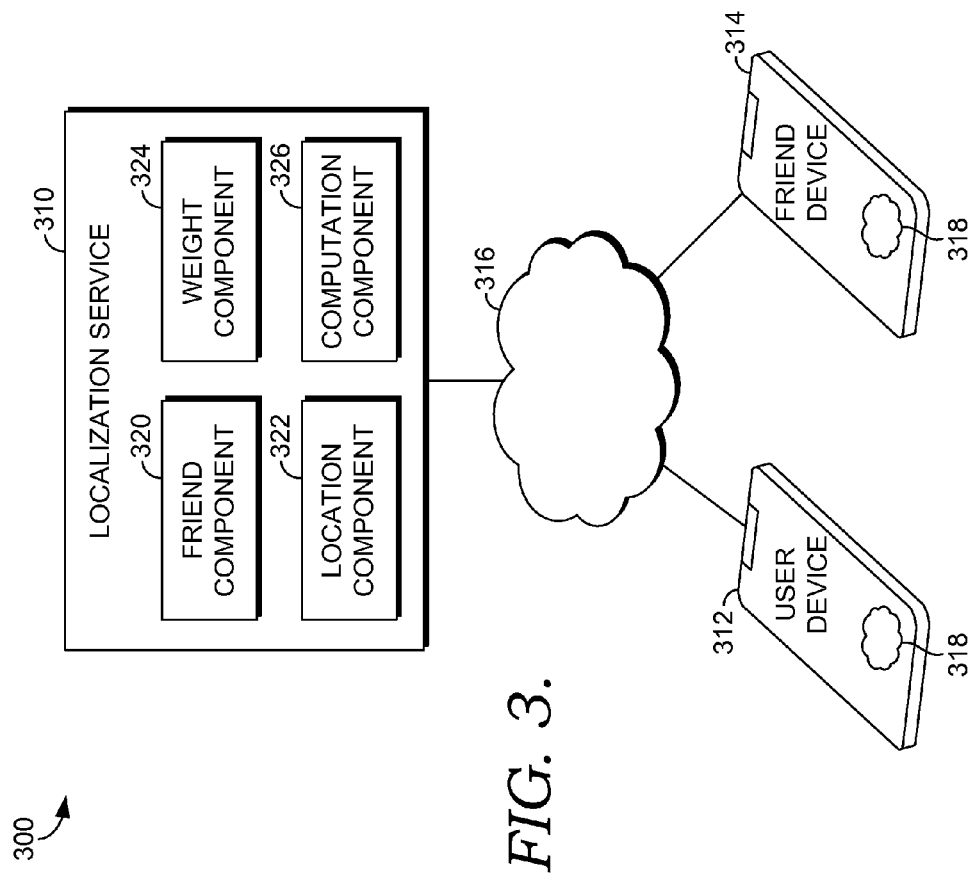
FIG. 3 depicts a block diagram of an exemplary system suitable for localizing a user of a mobile device using friend location information according to an embodiment of the technology.

Turning now to FIG. 3, a block diagram of an exemplary system suitable for localizing a user of a mobile device using friend location information is depicted and is referenced generally by the numeral 300. It will be understood that the exemplary system 300 shown in FIG. 3 is merely an example of one suitable computing system environment for use with embodiments of the present invention. Neither should the exemplary system 300 be interpreted as having any dependency or requirement related to any single module/component or combination of modules/components illustrated therein. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The exemplary system 300 includes a localization service 310, a user device 312, and a friend device 314 all in communication with one another via a network 316. The network 316 may include, without limitation, one or more LANs and/or wide area networks WANs. Such networking environments are commonplace in offices, enterprise-wide computer networks, intranets, and the Internet. Accordingly, the network 316 is not further described herein. The user device 312 and the friend device 314 may be the user device 118 and the friend device 120 of FIG. 1, and, as such, will not be further described herein. The localization service 310 may carry out the computer-executable instructions 116 or 122 of FIG. 1. As well, the localization service 310 may reside on a network server (the network server 114 of FIG. 1) or the localization service may reside on the user device 312 or the friend device 314 as an application 318.

The localization service 310 may work with any type of computing device such as, for example, the user device 312, the friend device 314, or the network server 114 described with reference to FIG. 1. While the localization service 310 is illustrated as a single unit, it will be appreciated that the localization service 310 is scalable. For example, the localization service 310 may in actuality include a plurality of computing devices in communication with one another. The single unit depictions are meant for clarity, not to limit the scope of embodiments in any form.

As shown in FIG. 3, the localization service 310 comprises a friend component 320, a location component 322, a weight component 324, and a computation component 326. In some embodiments, one or more of the components 320, 322, 324, and 326 may be implemented as stand-alone applications. In other embodiments, one or more of the components 320, 322, 324, and 326 may be integrated directly into the operating system of a computing device such as the user device 312, the friend device 314, or the network server 114 of FIG. 1.

In addition, one or more of the components 320, 322, 324, and 326 may be integrated directly into the database 112 of FIG. 1. The components 320, 322, 324, and 326 illustrated in FIG. 3 are exemplary in nature and in number and should not be construed as limiting. Any number of components may be employed to achieve the desired functionality within the scope of embodiments hereof.

As a preface to the more detailed description below regarding the components of the localization service 310, some general information is provided regarding some of the premises on which the invention is based. In this day of social-connectedness, a person is connected to many other people both in an online setting and in an offline setting. Online connectedness can be seen in online social networks such as Facebook® and Twitter®, online gaming networks, online chat rooms, online interest groups, and the like. Offline connectedness occurs in traditional ways such as people meeting at various clubs or venues, meeting in a workplace environment, or meeting in a family environment. As used throughout this specification, the term "social network" encompasses both online social-connectedness and offline social-connectedness.

People within the same social network generally demonstrate some type of location correlation. For example, co-workers co-locate in a business establishment during business hours, and family members co-locate at home, a shopping mall, a vacation resort, etc. Thus, there can be a positive location correlation between the user and people within the user's social network. There can also be a negative location correlation between the user and the people within the user's social network. With respect to a married couple, when one person is at work, the other is likely located at a different workplace environment or at home. Or if one co-worker is at home outside of normal business hours, the other co-worker is likely to be located at a different home. Both positive and negative location correlation information may be used when estimating a location for the user.

Turning back to FIG. 3, the friend component 320 is configured to identify people within the user's social network (hereinafter known as "friends"). This is accomplished in a variety of ways. The friend component 320 may leverage information that already exists within a wireless-telecommunications-network, as well as information that is independent of the wireless-telecommunications-network. For example, the friend component 320 may access the user's call data records stored in a database such as the database 112 of FIG. 1. The call data records may provide an indication of who the user is communicating with, how often the user communicates with certain people, and the duration of calls. The friend component 320 may also access the user's messaging records. Like above, the messaging records may give an indication of who the user is messaging (via text messaging or email), and how often the user is messaging a certain person.

The friend component 320 may also access information concerning the user's friends from Internet use records. Again, this information may be stored in a database such as the database 112 of FIG. 1. The information may include general Internet usage patterns of the user as well as the types of online social networks the user is involved with, and how actively the user is involved with these networks. In addition, information may be gathered concerning whether the user is involved in online gaming networks and, if so, who the user plays online games with, how often the user plays with a certain player, and the duration of game play with a certain person.

The friend component 320 may also access information about the user's friends via applications on the user's mobile device. For example, there may be an application that allows the user to recommend services, Web pages, URLs and the like to the user's friends. Information may be gathered concerning to whom the user is making recommendations, as well as how often recommendations are made to any one person. In another illustrative example, there may be an application that allows the user to share localization information with friends and vice versa. Thus, information may be gathered concerning historical location information of the user and the user's friends.

The friend component 320 is also configured to access information that is generally available to the public to help identify the user's friends. For example, a user's Facebook® friend list is generally publicly available. The friend component 320 may access this information and, in one aspect, store the information in a database such as the database 112 of FIG. 1. The friend component 320 can also access image captures from publicly placed cameras. Thus, a camera could capture an image of the user entering a coffee store with a friend. The friend component 320 utilizes the information gathered from some or all of these sources to generate a list of friends in the user's social network.

In one aspect, the friend component 320 is configured to apply a set of rules to the gathered information in order to identify the user's friends. By way of illustrative example only, a friend of the user may be identified if the friend interacts with the user beyond a minimum predetermined threshold level. Or, in another illustrative example, a friend of the user may be identified if the friend interacts with the user within a circumscribed geographical area. Any and all such variations are within the scope of embodiments of the present invention.

The location component 322 is configured to determine a location of the friends identified by the friend component 320. At a high level, the location component 322 localizes an event generated by a friend. Such generated events include the friend making or receiving a voice call, a text message, an Internet call, an email message, and the like. Traditional localization methods may be used by the location component 322 to determine a location for the friend. These include call sector information, global positioning system (GPS) information, triangulation information, round-trip-time information, signal-to-noise-and-interference ratios, network topology, and other methods known in the art. Most of these methods rely on the friend belonging to the same wireless-telecommunications-network as the user, but it is also possible to localize a friend even if the friend is not part of the same telecommunications-network as the user. For example, the user and the friend may share location information via an application on their respective mobile devices. Or reciprocal agreements may be in place between the user's wireless-telecommunications-network and the friend's wireless-telecommunications-network. These agreements may provide for sharing of localization information.

In another aspect of the invention, the location component 322 is configured to determine a location for the user with a first level of accuracy and to determine a location for the user's friend with a second level of accuracy. If the friend's location is known with a greater level of accuracy than the user's location, the friend's location may be used to refine the user's location. By way of illustrative example, assume that the GPS system on the user's mobile device is disabled. The location component 322 is able to determine the user's location utilizing information such as call sector information, triangulation, round-trip-time, etc. Further, assume that the GPS system on the friend's mobile device is fully functional. The location component 322 is able to determine the friend's location with a greater level of accuracy than that of the user's location. The friend's accurate location information may be used to refine the user's location as will be explained in greater depth below.

The weight component 324 of FIG. 3 is configured to determine a social-interaction strength between the user and each of the user's friends, or an amount of mutual information shared between the user and each of the user's friends. These pieces of information are used to generate weights for each of the friends. Social-interaction strength is a measure of the level of social interaction between the user and each of the friends. In one aspect, this could be a fraction of a respective total of calls, talk time, etc. For example, assume the user made 10 voice calls, 5 of which were to "Friend A," 3 of which were to "Friend B," and 2 of which were to "Friend C." A social-interaction strength for Friend A would be 5/10 or 0.5, while a social-interaction strength for Friends B and C would be 0.3 and 0.2 respectively. Or, in another example, assume the user made voice calls totaling 100 minutes in duration. Fifty of those minutes were spent talking to Friend A, 30 minutes to Friend B, and 20 minutes to Friend C. A social-interaction strength for Friends A, B, and C would be 0.5, 0.3, and 0.2 respectively. Social-interaction strength may also be determined by an absolute number of calls, talk time, etc. between the user and each of the user's friends. For example, if the user spent four hours talking to Friend A, this could indicate a social-interaction strength of 4.

Other metrics available to determine a social-interaction strength between the user and the friend include a fraction of: a number of email messages, a number of visits to a same Web page, a number of text messages, a number of times a user recommends a URL, a number of times the user plays a multiplayer game with the friend, a number of times the user visits a same geographical location as the friend, and the like. These metrics may be combined and/or weighted to further define a social-interaction strength between the user and the friend. The social-interaction strength between the user and each of the friends comprises a set of weights of social ties that respectively indicate a level of social interaction between the user and the user's friends. The set of weights of social ties may be used when estimating the user's location, as will be explained in greater depth below.

The social-interaction strength between the user and each of the user's friends may, in one aspect, be time dependent. For instance, co-workers have a higher degree of social interaction (resulting in a greater social-interaction strength value) during workday hours compared to nonworkday hours. And family members may have a higher degree of social interaction on the weekends compared to weekdays. Other examples of time dependency include holidays versus nonholidays, daytime versus nighttime, and/or time of year. Thus, a social-interaction strength between the user and the friend may be further weighted by the weight component 324 according to a time variable.

As mentioned earlier, the weight component 324 is also configured to determine an amount of mutual information shared between the user and each of the user's friends. Mutual information is a mathematical concept that measures, in its simplest aspect, the information shared between two variables X and Y. The information may comprise both social information and location information. In other words, mutual information measures how much knowing one of the variables reduces the uncertainty about the other variable. For example, if X and Y are independent, then knowing information about X does not give any information about Y and vice versa. At the other end of the spectrum, if X and Y are identical then all the information associated with X is shared with Y and knowing X determines the value of Y. Between these two poles lies the concept that X and Y may share some information, and the amount shared is quantifiable using the following equation:

$$I(X,Y)=H(X)+H(Y)-H(X,Y)$$

In this equation, I(X,Y) represents mutual information shared between X and Y, H(X) represents the entropy (or degree of uncertainty) of X, H(Y) represents the entropy of Y, and H(X,Y) represents the joint entropy of X and Y.

In one aspect of the invention, the variables X and Y may represent individual people (i.e., the user and one of the user's friends). In another aspect of the invention, the variables X and Y may represent groups that the user or the friend belongs to. For example, if the friend is an active member of the Sierra Club, the user is more likely to share mutual information with the friend when the friend is with the Sierra Club.

Figure 4:
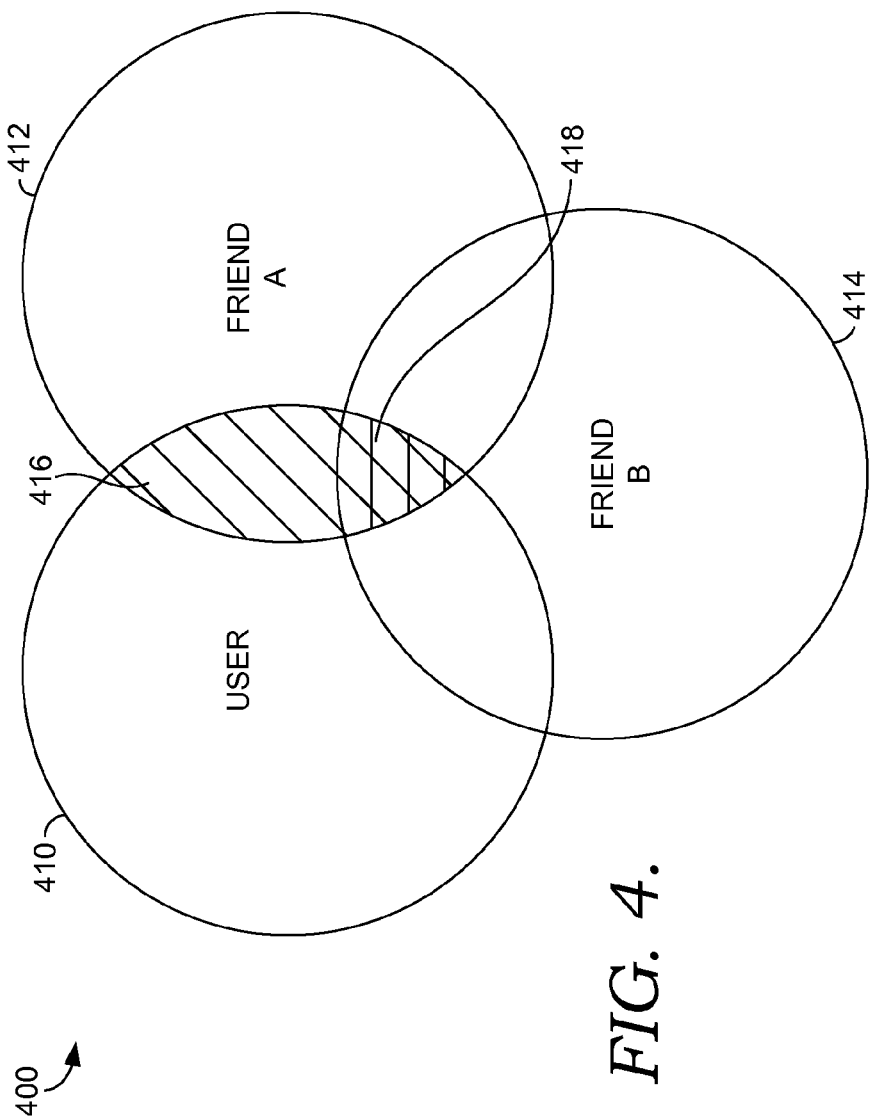
FIG. 4 depicts an exemplary diagram illustrating mutual information shared between a user and friends in accordance with an embodiment of the technology.

The concepts behind mutual information can be extended beyond a pair-wise approach. For example, instead of just determining the mutual information that is shared between the user and one friend, mutual information that is shared between the user, Friend A, and Friend B can be determined. This concept is illustrated in FIG. 4. Information about the user is shown as a circle 410, information about Friend A is shown by a circle 412, and, additionally, information about Friend B is shown by a circle 414. As can be seen, the intersection 416 of the circle 410 and the circle 412 represents the information shared between the user and Friend A (i.e., I(X, A)). Additionally, the intersection 418 of circles 410, 412, and 414 represents the information shared between the user, Friend A, and Friend B (i.e., I(X,A,B)).

After the mutual information shared between the user and each of the user's friends is determined, the mutual information is summed and a weight for each friend is determined. For example, assume S represents the sum of I(X,A), I(X,B), and I(X,C) where X represents the user, and A, B, and C represent the user's friends. A weight is found for each friend by taking the mutual information for the friend and dividing it by S, for example: $w_A=I(X,A)/S$. Like above, these weights may also be time dependent. In other words, more information may be shared between the user and a friend during certain days, hours, holidays, etc.

Returning to FIG. 3, in one aspect of the invention, the computation component 326 is configured to estimate a location of the user based on the friend locations determined by the location component 322 and the set of weights determined by the weight component 324. With respect to this aspect, the location of the user is unknown. One reason for this may be that the user has turned off his or her mobile device. The computation component 326 estimates the location of the user using conditional probability based on the friend locations. Conditional probability rests on the premise that it is possible to estimate the probability of some event given the occurrence of some other event. For example, the variable X is used to represent the user's location. The variable X has a probability distribution equal to:

$$P(X=x_1, x_2, \ldots, x_n)$$

In other words, the user's location is distributed along "n" values—the user could be at any one of the locations $x_1$, $x_2, \ldots, x_n$. Each location is associated with a certain probability that the user is located at that location. This initial distribution vector can be generated using historical location data associated with the user. The initial distribution vector (based on historical location data) can be calculated and updated using an exponentially weighted moving average. For example, time is partitioned into time window, say a week, and the user's location distribution is measured for this particular time window. Then the historical probability of the user being in a location i can be updated as $x_i=(1-\alpha)x_i+\alpha x\hat{}_i$, where $x\hat{}_i$ refers to the fraction of time the user is observed at location i during this time window, and $\alpha$ is a predefined weight between 0 and 1.

Knowing that the user has friends A, B, and C, and knowing that friends A, B, and C, are located at locations $Y_A$, $Y_B$, and $Y_C$ respectively, conditional probability is used to estimate a location for the user as follows:

$P(X=x_1|A$ is at location $Y_A)$, $P(X=x_2|A$ is at location $Y_A), \ldots, P(X=x_n|A$ is at location $Y_A)$;

$P(X=x_1|B$ is at location $Y_B)$, $P(X=x_2|B$ is at location $Y_B)$, ..., $P(X=x_n|B$ is at location $Y_B)$; and $P(X=x_1|C$ is at location $Y_C)$, $P(X=x_2|C$ is at location $Y_C)$, ..., $P(X=x_n|C$ is at location $Y_C)$.

The invention uses A, B, and C's location information to refine the initial distribution vector for X. The computation component 326 then takes a weighted sum of the conditional probabilities that X is at the three different locations $Y_A$, $Y_B$, and $Y_C$ as follows:

$P(X)=w_A*P(X|A$ is at location $Y_A)+w_B*P(X|B$ is at location $Y_B)+w_C*P(X|C$ is at location $Y_C)$.

The weights may be the set of weights based on a social-interaction strength or the set of weights based on mutual information. As well, each of the weights may be further adjusted according to time as discussed above.

Figure 5:
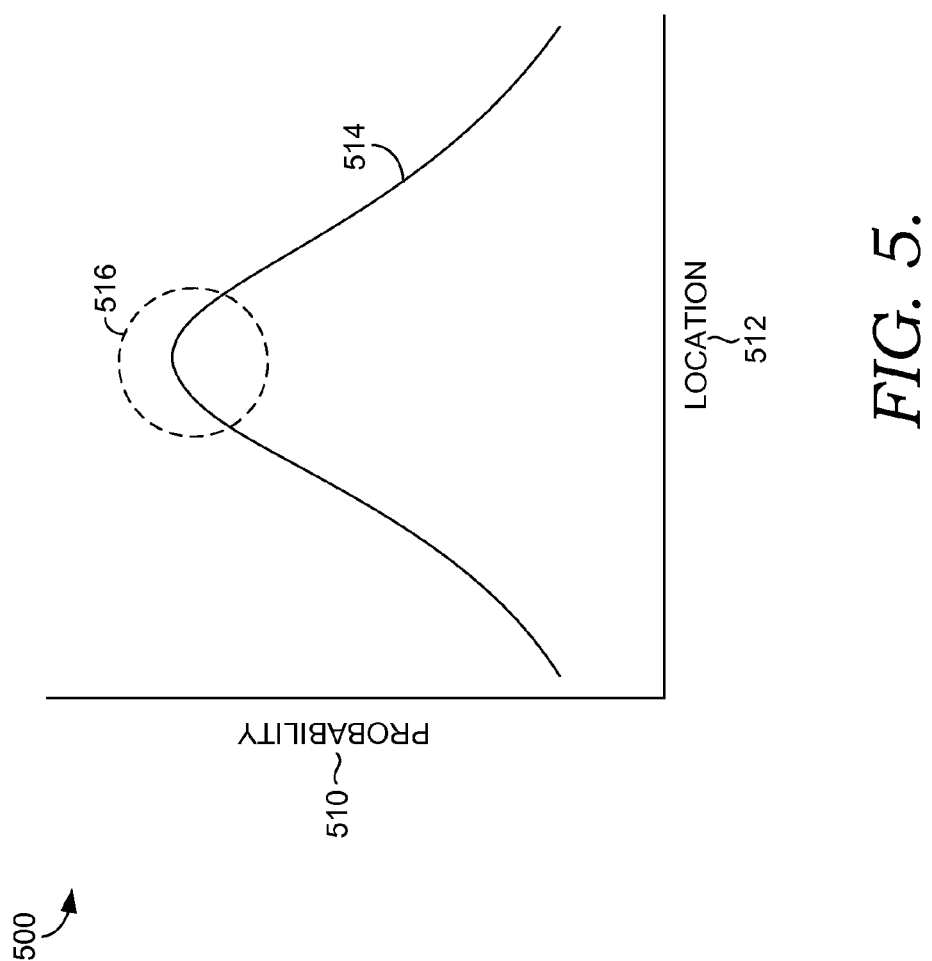
FIG. 5 depicts an exemplary graph illustrating a probability distribution of user locations in accordance with an embodiment of the technology.

The result of the above set of computations is a refined distribution vector of the user's estimated location. Such a distribution vector is illustrated in FIG. 5 (reference number 500) and indicated by the numeral 514. As can be seen, the y-axis represents probability 510, and the x-axis represents location 512. In one aspect, a probable location of the user is within the distribution vector 514. In another aspect, a maxima 516 of the distribution vector 514 indicates a set of probable locations for the user.

Turning back to FIG. 3, in another aspect of the invention, the computation component 326 is configured to estimate a location for the user using a centroid of the friend locations. For example, if the friends are located within close geographic proximity of each other, the computation component 326 creates a shape corresponding to the location points. The computation component 326 then finds the geometric center of the shape. If the shape is three-dimensional, the centroid would be the intersection of all hyperplanes that divide the shape into equal parts. Thus, the user's location could be estimated as the centroid of the friend locations.

In yet another aspect of the invention, the computation component 326 is configured to refine an estimated location for a user using an accurate location associated with a friend of the user. As outlined above, the location component 322 may be able to determine a location for the user with a first level of accuracy. Further, the location component 322 may be able to determine a location for the user's friend with a higher level of accuracy. If the user's estimated location is within a predetermined geographical proximity of the friend's location, the computation component 326 utilizes the friend's accurate location to refine the user's location. However, if the user's location is outside the predetermined geographical proximity of the friend's location, the friend's location is not utilized to refine the user's location.

Assuming that the computation component 326 is able to utilize the friend's accurate location to refine the user's location, the computation component 326 determines a probability that the user is co-located with the friend. In one aspect, the probability may be time dependent (i.e., it is more probable that the user is co-located with the friend during working hours). If the probability exceeds a predetermined threshold, the computation component 326 utilizes the friend's location to refine the user's location. In one aspect, the computation component 326 utilizes the friend's location to refine the user's location only if the probability of co-location is high.

Figure 6:
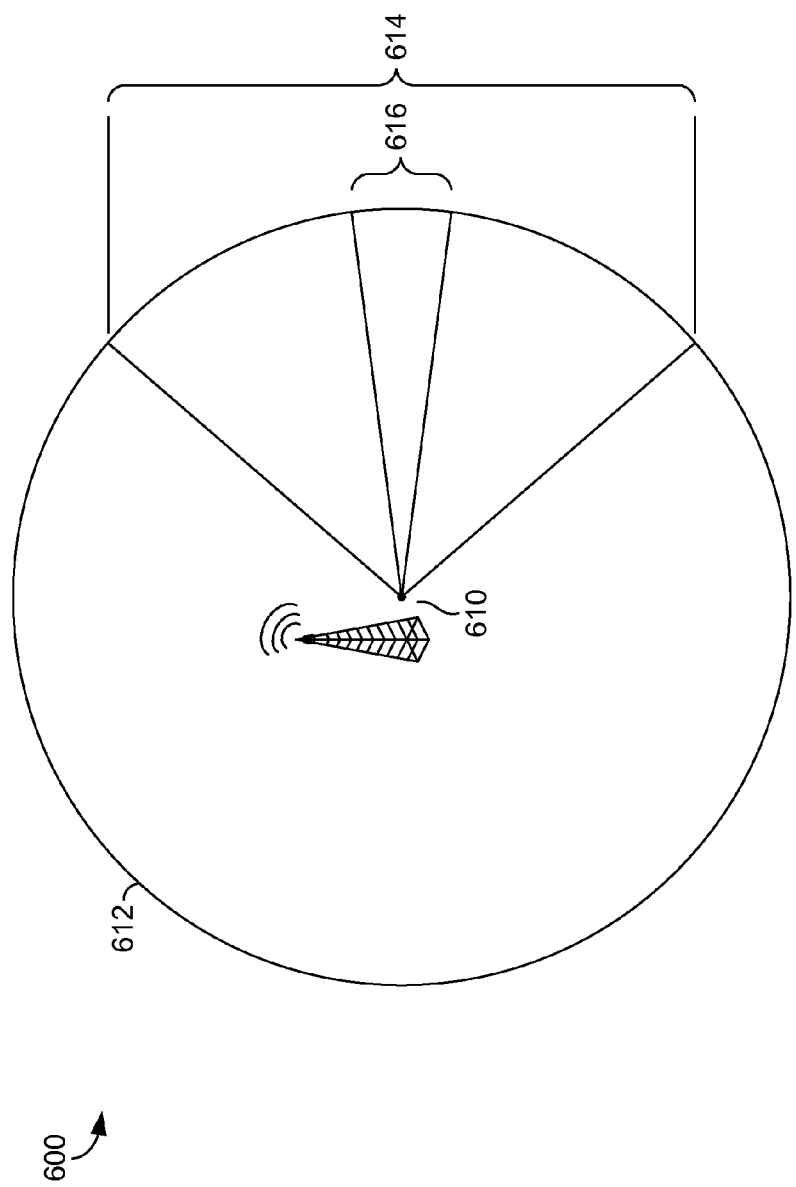
FIG. 6 depicts an exemplary diagram illustrating a user's estimated location and a friend's accurate location in accordance with an embodiment of the technology.

FIG. 6 depicts a diagram illustrating how a friend's accurate location may be used to refine a user's estimated location; FIG. 6 is referenced generally by the numeral 600. FIG. 6 depicts a cell tower 610 of a wireless-telecommunications-network with a coverage area depicted by circle 612. Localization techniques are used to estimate a location of the user within the coverage area. The location of the user is shown by sector 614. As well, localization techniques are used to estimate a location of the user's friend; this location is shown by sector 616. The sector 616 may be smaller than the sector 614 because, for example, the friend may have a GPS-enabled phone, while the user may not. If there is a good probability that the user is co-located with the friend, the friend's location information (as represented by the sector 616) is used to narrow the range of possible user locations from the sector 614 to the sector 616.

Turning now to FIG. 7, referenced generally by the numeral 700, a flow diagram is depicted showing a method of estimating a user's location using the locations of the user's friends and social interactions between the user and the friends. At a step 710, the user's friends are identified. This may be accomplished by, for example, the friend component 320 of FIG. 3. Both online and offline sources are searched to determine who the user interacts with, and how often the user interacts with any one person. From these sources, a list of friends is generated.

At a step 712, a social-interaction strength between the user and each of the friends is determined. This may be accomplished by, for example, the weight component 324 of FIG. 3. The social-interaction strength is a measure of the amount of social interaction between the user and a friend. It encompasses both online social interaction and offline social interaction. In one aspect of the invention, the social-interaction strength may be time weighted to take into account the reality that the user may spend more time with the friend during certain days, hours, weeks, etc. The social-interaction strengths for the various friends are normalized to produce a set of weights of social ties.

At a step 714, the location of the user's friends is determined using various localization techniques known in the art. This may be accomplished, for example, by the location component 322 of FIG. 3. And at a step 716, the user's location is estimated based on the friend locations and the set of weights of social ties (by, for example, the computation component 326 of FIG. 3). In one aspect of the invention, conditional probability is used to determine a distribution vector of possible user locations. In another aspect, the maxima of the distribution vector is used to refine the possible number of user locations. In yet another aspect, if the friends are located within close geographic proximity of each other, a centroid is used to estimate the user's location.

Turning now to FIG. 8, a flow diagram (referenced generally by the numeral 800) is depicted showing a method of estimating a user's location using the locations of the user's friends and mutual information shared between the user and the friends. At a step 810, and similar to step 710 of FIG. 7, the user's friends are identified. At a step 812, a location for each of the friends is determined—again similar to step 714 of FIG. 7.

At a step 814, mutual information that is shared between the user and the friends is determined. In one aspect, mutual information is determined using a pair-wise approach. For example, mutual information that is shared between the user and one friend at a time is determined. The pair-wise approach may also include information shared between the user and a friend's group, or between the user's group and a friend, or between the user's group and the friend's group. Still further, mutual information shared between more than two people or two entities may be determined. The mutual information is used to generate a set of weights of mutual information. The weights may be further weighted according to a time variable. At a step 816, the user's location is estimated based on the friend locations and the set of weights of mutual information using the process outlined above with respect to FIG. 7.

Figure 9:
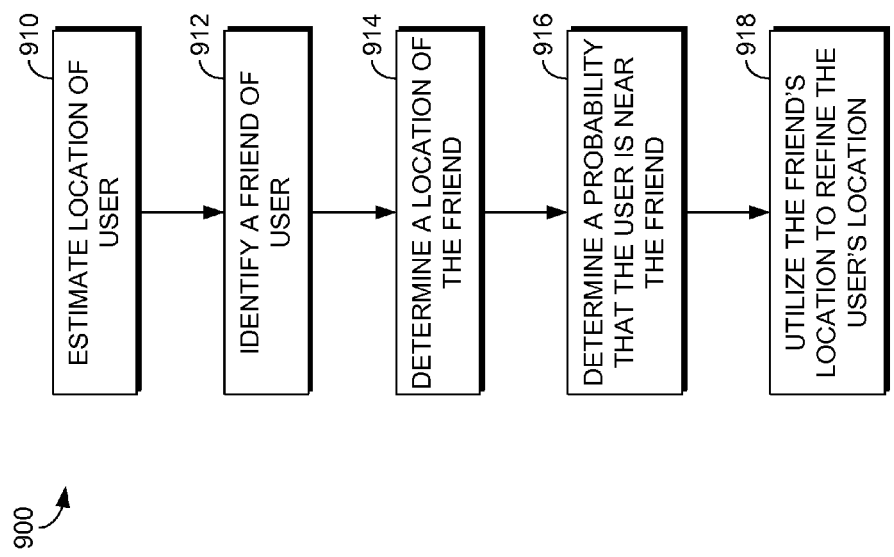
FIG. 9 is a flow diagram showing a method of refining an estimated location for a user using an accurate location associated with a friend of the user in accordance with an embodiment of the technology.

Turning now to FIG. 9, a flow diagram is depicted showing a method of refining an estimated location for a user using an accurate location associated with a friend of the user. The flow diagram is referenced generally by the numeral 900. At a step 910, a location is estimated for the user using standard localization techniques. The user location has a first level of accuracy. At a step 912, a friend of the user is identified, and, at a step 914, a location of the friend is determined. Because of differences in the method of localization, the friend location has a higher level of accuracy than the user's location. In one aspect, the user's location is used to accept or reject the friend's location. For example, the friend's location may be rejected if it is too far away from the user. Likewise, the friend's location may be accepted if it is within a predetermined geographical proximity of the user.

If the friend's location is accepted, at a step 916, a probability is determined that the user is co-located near the friend. In one aspect, this probability may be time weighted. If the probability exceeds a predetermined threshold, at a step 918, the friend's accurate location is used to refine the user's estimated location.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One of more computer storage devices having computer-executable instructions embodied thereon that, when executed, enable a computing device to perform a method of estimating a location of a user of a mobile device using locations of one or more friends of the user, the method comprising:
identifying the one or more friends of the user;
determining a social-interaction strength between the user and each of the one or more friends, resulting in a set of weights of social ties that respectively indicate a level of social interaction between the user and each of the one or more friends;
determining a location of each of the one or more friends, resulting in a set of friend locations; and
estimating the location of the user based on the set of friend locations and the set of weights.

2. The one or more computer storage devices of claim 1, wherein identifying the one or more friends of the user comprises at least one of identifying friends in the user's online social network, accessing call data records of the user, or accessing messaging records of the user.

3. The one or more computer storage devices of claim 1, wherein determining a social-interaction strength between the user and each of the one or more friends of the user comprises at least one of the following:
(A) mobile device talk time between the user and each of the one or more friends,
(B) a number of mobile device calls between the user and each of the one or more friends,
(C) a number of electronic mail messages between the user and each of the one or more friends,
(D) a number of visits to a same Web page by the user and each of the one or more friends,
(E) a number of text messages between the user and each of the one or more friends,
(F) a number of times the user recommends a uniform resource locator to each of the one or more friends,
(G) a number of times the user plays a multiplayer game with each of the one or more friends,
(H) a number of times the user visited a geographical location with each of the one or more friends, or
(I) a fraction of any of the above as compared to a respective total of each of the above.

4. The one or more computer storage devices of claim 1, wherein determining a location of each of the one or more friends of the user includes localizing an event generated by each of the one or more friends.

5. The one or more computer storage devices of claim 4, wherein the event generated by each of the one or more friends includes making a call on a mobile device.

6. The one or more computer storage devices of claim 1, wherein the set of weights is time dependent.

7. The one or more computer storage devices of claim 1, wherein the location of the user is estimated by utilizing conditional probability based on the set of friend locations.

8. The one or more computer storage devices of claim 7, wherein the location of the user is a distribution of user locations, and wherein a most probable location of the user is within the distribution of user locations.

9. The one or more computer storage devices of claim 8, wherein the location of the user is based on a maxima of the distribution of user locations, wherein the maxima of the distribution of user locations indicates a set of probable locations.

10. The one or more computer storage devices of claim 1, wherein given that the location of each of the one or more friends is within a close geographic proximity of one another, estimating the location of the user by using a centroid of the set of friend locations.

11. A computerized method carried out by at least one server having at least one processor for performing a method of estimating a location of a user of a mobile device using locations associated with one or more friends of the user, the method comprising:
identifying the one or more friends of the user;
determining, using the at least one processor, a location of each of the one or more friends, resulting in a set of friend locations;
determining mutual information that is shared between the user and the one or more friends, resulting in a set of weights of mutual information that respectively indicate a level of shared information between the user and each of the one or more friends; and
estimating the location of the user based on the set of friend locations and the set of weights.

12. The computerized method of claim 11, wherein the location of each of the one or more friends is determined using at least one of:
(A) Global Positioning System,
(B) call sector information,
(C) triangulation information,
(D) round-trip-time information,
(E) signal-to-noise-and-interference ration, or
(F) network topology.

13. The computerized method of claim 11, wherein the mutual information is determined using a pair-wise approach between the user and each of the one or more friends.

14. The computerized method of claim 11, wherein the mutual information is determined based on involvement of the user and the one or more friends with one or more social groups.

15. The computerized method of claim 11, wherein the mutual information is time dependent.

16. The computerized method of claim 15, wherein the time depends upon at least one of the following:
   (A) daytime versus nighttime,
   (B) weekend versus weekday,
   (C) holiday versus nonholiday,
   (D) time of year, or
   (E) workday hours versus nonworkday hours.

* * * * *